April 23, 1929.   G. A. JOHNSON   1,710,312
ARMORED ELECTRIC CABLE
Filed Dec. 1, 1925
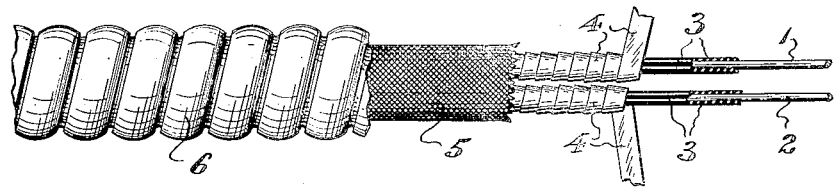
INVENTOR.
Gustave A. Johnson,
BY
Frantzef and Richards
ATTORNEYS.

UNITED STATES PATENT OFFICE.

GUSTAVE A. JOHNSON, OF IRVINGTON, NEW JERSEY, ASSIGNOR TO AMERICAN METAL MOLDING CO., OF IRVINGTON, NEW JERSEY, A CORPORATION OF NEW JERSEY.

ARMORED ELECTRIC CABLE.

Application filed December 1, 1925. Serial No. 72,437.

This invention relates, generally, to improvements in electric conductors in the form of armored cable; and the invention has reference, more particularly, to a novel construction of relatively low cost flexible armored cable containing, generally, positive and negative electrical conductors or circuit wires provided with a novel composite arrangement and construction of insulating elements.

The invention has for its principal object to provide a novel construction of armored cable to contain, generally, positive and negative circuit wires having a novel arrangement and construction of insulation elements of such character that the resultant armored cable may be made smaller in diameter and of less weight without sacrificing safety factors or full insulating efficiency, in consequence of which the finished product may be produced at less cost and therefore sold more cheaply; furthermore, this invention has for a further object to provide a form and construction of cable in which relatively expensive rubber and rubber compound insulation material, which is more or less subject to deterioration, is eliminated without loss of full insulation efficiency, and a novel composite insulation provided which is proof against fire, water, rodents, and which efficiently resists rupture under bending and pulling strains, abrasion or accidental blows; finally, this invention is adapted to provide a form of electric cable which is calculated to provide the conductors contained therein highly efficient protection both mechanically and electrically, as well as to provide a cable assured of durability and long life in use.

Other objects of this invention, not at this time more particularly enumerated, will be clearly understood from the following detailed description of the same.

The invention is clearly illustrated in the accompanying drawing, which shows an elevation of a cable made according to and embodying the principles of the invention, portions of the same being broken away to show the construction, elements and character of the composite insulation provided thereby.

In the said drawing, the novel cable is illustrated in a two-wire form, which is the form most commonly employed for general wiring purposes, but it will be understood that either single wire cable, or cable containing more than two wires may be constructed to embody the principles, elements and structure of my novel composite insulation, within the scope of this invention.

Referring to the said drawing, the reference characters 1 and 2 respectively indicate the metallic electrical conductors or current carrying wires, which are in most cases made of copper. These conductors or wires 1 and 2 are each provided with an enveloping coating of a suitable insulating enamel 3. This enamel coating while relatively hard is non-cracking and comparatively flexible, and of itself provides a highly efficient electrically non-conductive protective covering for each wire. By reason of its high insulating efficiency, said enamel coating 3 may be employed as a relatively thin external layer compared with the thickness of rubber compounds ordinarily employed, thus being a factor in reducing the cross-sectional bulk or thickness of the finished cable; at the same time, since the enamel coating 3 is comparatively flexible and non-cracking it is not subject to fracture or rupture, when the finished cable is flexed or bent in use. Each enamel coated wire is provided with a wrapping of paper, applied thereto by winding a paper strip 4 spirally thereabout, with the convolutions of the paper wrapping thus produced overlapping one upon another. The spirally wound and convolutely overlapped paper strip 4 permits an adequate degree of bending without opening up of gaps, and consequently forms an important factor of high insulation value as an element of the composite insulation structure according to this invention. If desired the paper strip 4 may be treated or impregnated with any suitable water and fire-proofing agent.

After the enamel coated and paper wrapped wires 1 and 2 have been prepared, the same may be brought into desired parallel relation, whereupon there is applied thereto a woven or braided textile fabric sheath 5, which may be made from cotton, silk or other vegetable fiber. This fabric sheath 5 serves to hold the two or more enamel coated and paper wound conductors or wires compactly arranged in the desired parallel relation. It is desirable to impregnate the said fabric sheath 5 with a suitable fire-proofing agent.

The enamel coated, paper wrapped, and fabric sheathed conductors or wires now provide a structure of comparatively small cross-sectional dimension, and yet each conductor or wire is individually enclosed in adequate insulation, and the resultant structure is ready for the external application thereto of the outer flexible metallic or other suitably formed armor 6 which completes the cable construction. The metallic armor consists in one or more metallic strips helically wound with their convolutions suitably interlocked one with another, but so as to allow a reasonable degree of flexing or bending, in the manner familiar to those skilled in the art. Owing to the fact that the insulation elements, comprised in the enamel coatings, paper wrappings, and fabric sheath, individually provide comparatively thin layers of insulation, it follows that together they tend to reduce considerably the cross-sectional mass when operatively assembled with the wires or conductors, consequently the metallic armor 6 may be wound to a comparatively small diameter, whereby a considerably less weight of metal is required in making up a given length of cable, and consequently a considerable saving in the cost of the product is effected, while nevertheless attaining an insulation structure of highest efficiency, so that while less expensive the resultant cable is nevertheless of higher quality than the ordinary armored cable of corresponding capacity and standard. Furthermore, the metallic armor 6 permits the usual protective grounding when using the cable in practice.

I am aware that some changes may be made in the various arrangements and combinations of the several devices and parts, as well as in the details thereof, without departing from the scope of this invention as hereinabove described and as defined in the appended claims. Hence, I do not limit this invention to the exact arrangements and construction of the parts as described in the foregoing specification, nor do I confine myself to the exact details of the construction of said parts as illustrated in the accompanying drawings.

I claim:—

1. An electric cable, comprising metallic electrical conductors, each conductor being provided with a coating of insulation enamel, a paper insulating element in strip form spirally wound about each enamel coated conductor with adjacent convolutions overlapping one another, said conductors thus enveloped being disposed in substantially side by side relation, a tubular fabric sheath enclosing the thus related coated and wrapped conductors, said fabric sheath being impregnated with a fire-proofing agent, and an outer metallic armor helically wound over said fabric sheath.

2. An electric wiring cable, comprising a plurality of conductive wires each provided with an individual coating of insulation enamel, a paper insulation element having means to render the same fire and water proof, said paper insulation element being in the form of a strip spirally wrapped about each enamel coated wire, said thus coated and wrapped wires being assembled together in relatively side by side relation, a fabric sheath enclosing the thus assembled wires, said fabric sheath being impregnated with a fire-proofing agent, and an outer flexible metallic armor spirally wound to enclose the aforesaid assembly.

In testimony, that I claim the invention set forth above I have hereunto set my hand this 25th day of November, 1925.

GUSTAVE A. JOHNSON.